US00RE35597E

United States Patent [19]

Vassilicos

[11] E Patent Number: Re. 35,597

[45] Reissued Date of Patent: Aug. 26, 1997

[54] REFRACTORY ARTICLE FOR PREVENTING VORTEXING IN A METALLURGICAL VESSEL

[75] Inventor: Achilles Vassilicos, Allegheny County, Pa.

[73] Assignee: USX Corporation, Pittsburgh, Pa.

[21] Appl. No.: 355,488

[22] Filed: Dec. 14, 1994

Related U.S. Patent Documents

Reissue of:

[64] Patent No.: 5,171,513
Issued: Dec. 15, 1992
Appl. No.: 881,982
Filed: May 12, 1992

[51] Int. Cl.[6] ..... B22D 41/50

[52] U.S. Cl. ..... 266/230; 222/594

[58] Field of Search ..... 266/227, 230, 266/236, 275; 222/590, 591, 594

[56] References Cited

U.S. PATENT DOCUMENTS 3,596,804 8/1971 Barrow et al. ..... 222/146
4,842,170 6/1989 Del Vecchio et al. ..... 266/230

FOREIGN PATENT DOCUMENTS 0016855 1/1988 Japan .
63-40688 2/1988 Japan .

*Primary Examiner*—Scott Kastler
*Attorney, Agent, or Firm*—Armstrong, Westerman, Hattori, McLeland & Naughton

[57] ABSTRACT

A refractory article is provided for the prevention of vortexing in molten metal as it is drained through a nozzle in a metallurgical vessel. The article has at least on rib extending substantially radially outwardly from an opening therein for draining of molten metal from the vessel, said rib protruding upwardly from an inner surface of the article so as to prevent the formation of rotating boundary layer flow within the molten metal.

12 Claims, 2 Drawing Sheets

FIG. 1
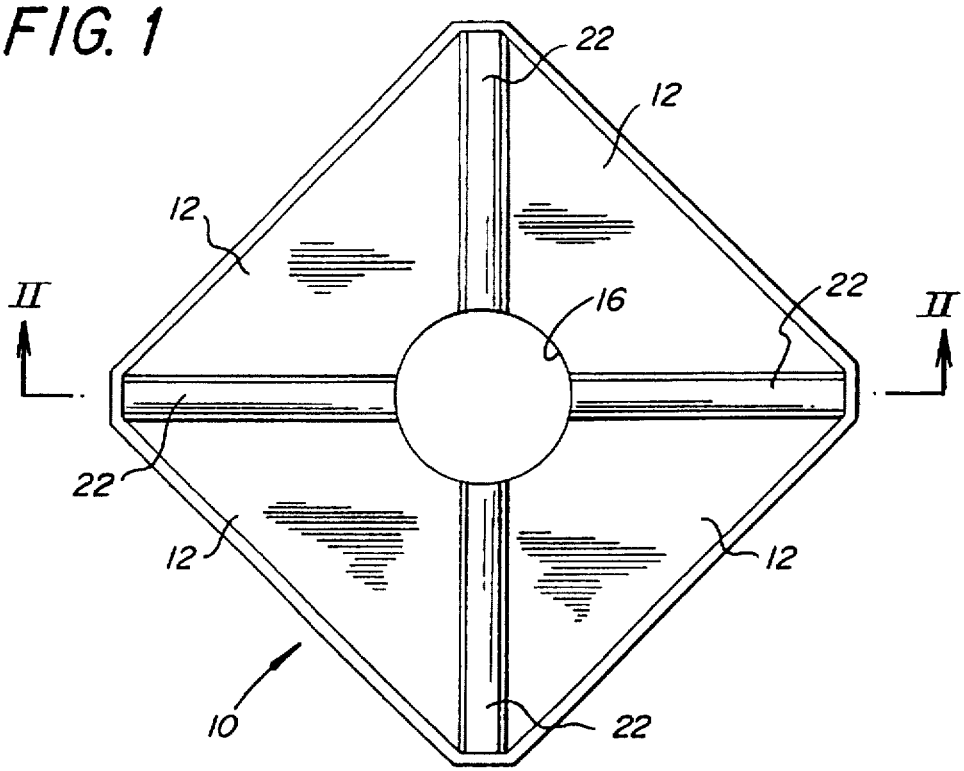
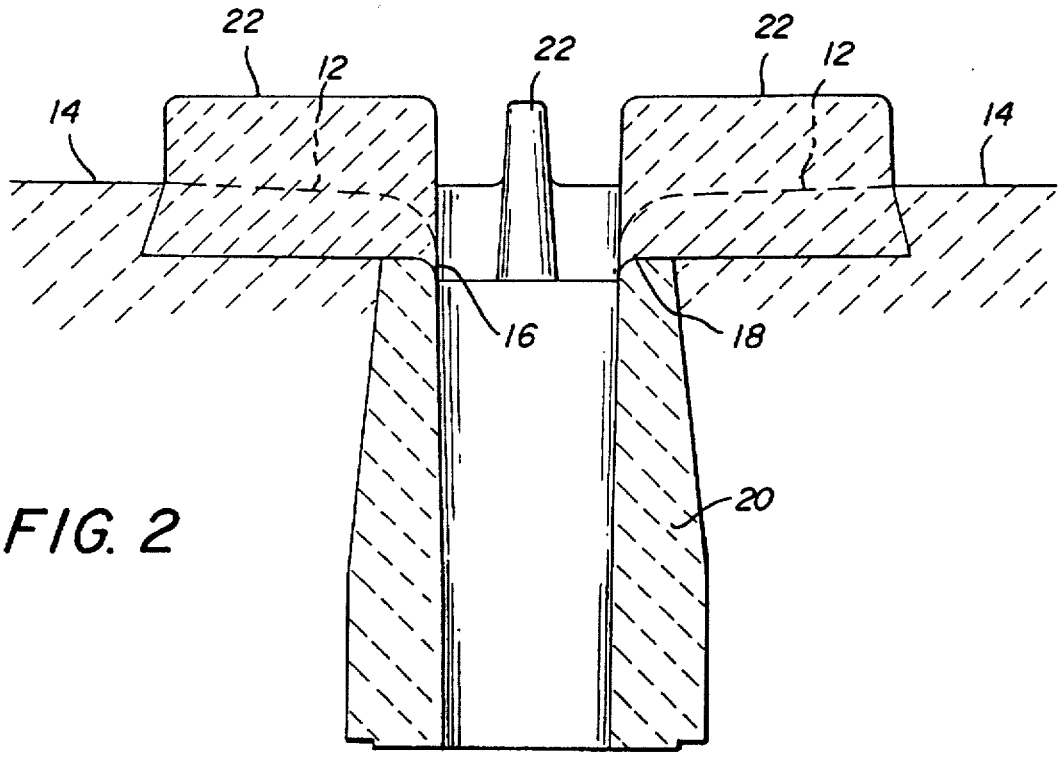
FIG. 2

REFRACTORY ARTICLE FOR PREVENTING VORTEXING IN A METALLURGICAL VESSEL

Matter enclosed in heavy brackets [ ] appears in the original patent but forms no part of this reissue specification; matter printed in italics indicates the additions made by reissue.

BACKGROUND OF THE INVENTION

The present invention relates to apparatus for preventing vortexing in molten metal as it is drained from a vessel, and particularly to a refractory element having at least one rib extending radially outwardly from a nozzle opening in the vessel, the rib protruding upwardly so as to prevent rotating boundary flow in the metal as it drains from the vessel.

In the continuous casting of steel, molten steel is drained from a ladle into a tundish and from the tundish into a continuous caster mold for solidification into a shaped product. Typically, the ladle will have a single nozzle with an opening for drainage of the steel into the tundish. The tundish also has at least one nozzle for passing the molten steel into the continuous caster mold. Regulation of flow rates through the ladle and tundish nozzles is generally accomplished by refractory slide gate mechanisms. As the level of molten steel in the ladle or tundish drops and the final remaining portion is passed through the nozzle a vortex usually forms in the steel in the region adjacent to the nozzle opening. The swirling motion of the vortex tends to cause mixture of non-metallic slag and scum with the steel passing through the nozzle. Entrapment of fine particles of slag and scum with the solidified steel adversely affects the resultant steel cleanliness. Such entrapment also causes breakouts through weak spots in the skin of the partially solidified casting resulting in interruptions of caster operation and loss of production. The entrained slag products also tend to reoxidize and deposit on the surfaces of tundish nozzles and submerged pouring tubes choking off the flow of molten steel through these critical passages to the caster mold.

Entrainment of slag and scum with molten steel also occurs during the draining of metallurgical refining vessels and furnaces. Attempts to prevent the mixing of slag and steel have included the use of stoppers which float at the interface between the slag and steel so as to partially or completely plug the nozzle or taphole opening before a significant amount of mixing occurs. Examples of such devices are shown in U.S. Pat. No. 4,462,574 and Japanese Patent Application J54042305. Attempts have also been made to specifically prevent vortexing without stopping flow of the steel through the nozzle. An example of the latter is shown at U.S. Pat. No. 4,524,958. This reference discloses injection of gas bubbles into the steel in the immediate vicinity of the taphole.

A tundish nozzle designed to prevent swirling of molten steel in the nozzle opening is shown in U.S. Pat. No. 4,079,868. The nozzle has four grooves in the wall forming the nozzle opening. The grooves extend longitudinally along the nozzle opening and are spaced approximately 90° apart. The reference nozzle is designed to prevent swirling within the nozzle. However, the reference nozzle does not appear to be directed to the prevention of vortexing in the molten steel before it reaches the nozzle opening. Moreover, the reference nozzle does not have protruding portions extending upwardly into the steel as does Applicant's invention.

SUMMARY OF THE INVENTION

According to this invention, a refractory article is provided for the prevention of vortexing during the draining of molten metal from a metallurgical vessel. The article has a refractory surface mateable with an inner refractory surface of the metallurgical vessel so as to form a continuation thereof and has an opening adapted to fit mateably with a nozzle opening in the vessel. At least one rib is provided which protrudes [inwardly] *upwardly* from said refractory surface of the article. The rib extends in a substantially radial direction outwardly from the opening and has an inner end located on the diameter of [an] *the axially* innermost end of the opening. The length of the rib is at least twice the diameter of the innermost end of the opening. The height of the rib above the refractory surface of the article is within a range of from about 0.25 inches (6.35 mm) to about 8 inches, (203.2 mm).

BRIEF DESCRIPTION OF THE DRAWINGS

FIG. 1 is a plan view of the refractory article of this invention for use in a tundish.

FIG. 2 is a section taken at II—II of FIG. 1.

DESCRIPTION OF THE PREFERRED EMBODIMENT

Figure 3:
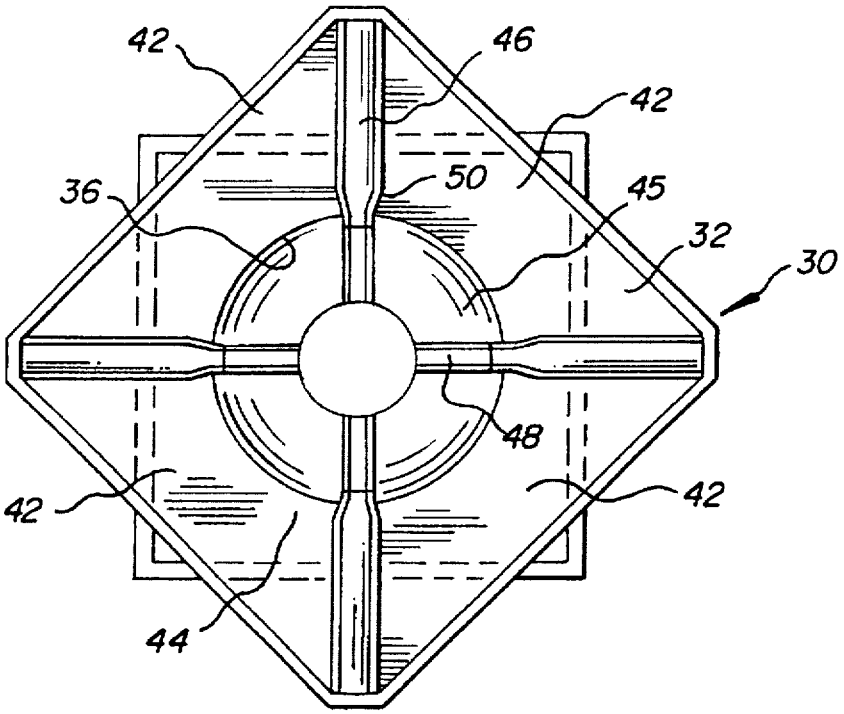
FIG. 3 is a plan view of the refractory article of this invention for use in a ladle.

Referring to FIG. 1, a refractory article 10 is shown which is adapted to be used in a tundish, for example, of the type for supplying molten metal to a continuous caster. The article has a refractory surface 12 which forms a continuation of an inner refractory surface 14 (FIG. 2) of the tundish. The article has an opening 16 which is adapted to fit mateably with an *axially* innermost end 18 of a nozzle well block 20 of the tundish (not shown). For purposes of this specification, I use the term "nozzle" to include both a nozzle and/or a nozzle well block as those terms are commonly used in the art. The article has at least one rib 22 protruding upwardly from the refractory surface [14] *12* so as to extend into molten metal to be contained in the tundish. An essential feature of the rib is that it has [an] *a radially* inner end located substantially on a diameter of the innermost end 18 of the nozzle opening. By substantially, I mean the essentially no horizontal component of rotating boundary layer flow is permitted to occur adjacent to the refractory surface in the vicinity of the nozzle opening. The rib extends outwardly from the inner end in a substantially radial direction from the opening *16*. The phrase in a substantially radial direction is meant to include straight ribs extending at an angle within a range of up to plus or minus 25 degrees with respect to the radial direction. The rib has a length of at least about twice the diameter of the innermost end of the opening. Preferably, the length of the rib is within a range of from about two to about ten times the diameter of the innermost end of the opening. The height of the rib is within the range of from about 0.25 inches (6.35 mm) to about 8 inches (203.2 mm). Preferably, the rib is of uniform height along its length. For a tundish, the height of the rib would preferably be within a range of from about 2 inches (50.8 mm) to about 4 inches (101.6 mm). I use a rib of 2.5 inches (63.5 mm). Most preferably, the article has four radial ribs spaced about 90 degrees apart. Each rib preferably has a cross sectional shape of a trapezoid. The thickness of the ribs is determined by structural and manufacturing requirements.

Figure 4:
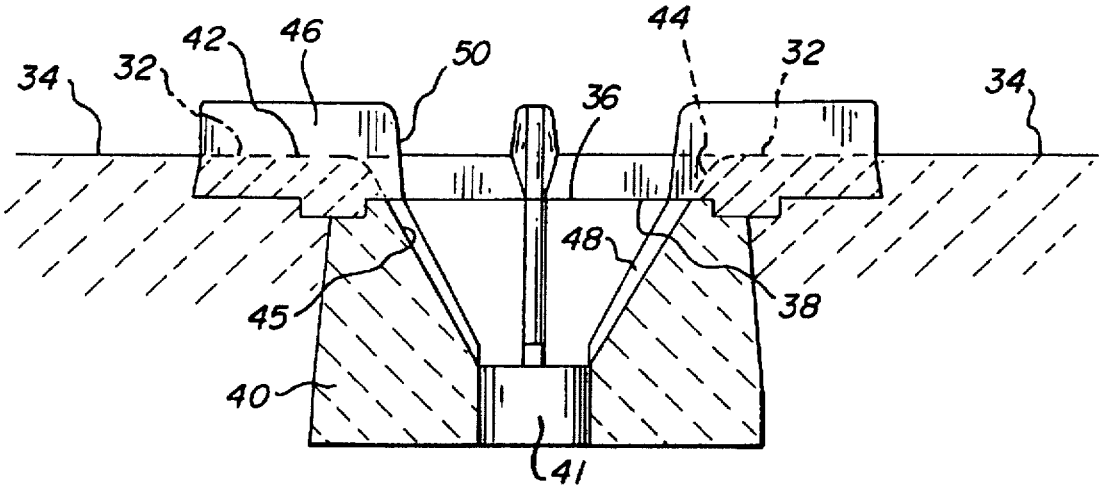
FIG. 4 is a section taken at IV—IV of FIG. 3.

Referring to FIGS. 3 and 4, a refractory article 30 is shown which is adapted to be used in a ladle. The article has a refractory surface 32 which forms a continuation of [an] *the axially* inner refractory surface 34 (FIG. 4) of the ladle.

The article has an opening 36 adapted to fit mateably with an innermost end 38 of a nozzle well block 40 of the ladle (not shown). The refractory surface of the article includes [an] *a radially* outer portion 42 which is essentially flat or horizontal and [an] *a radially* inner portion 44 which slopes so as to converge to the nozzle opening. *The downwardly sloping inner portion 44 of the refractory article is in mating relation with a correspondingly sloped portion 45 of the nozzle 40.* Again, the *downwardly* article has at least one rib protruding upwardly from the inner and outer portions of the refractory surface. The height of the rib on the outer portion [46] *42* of the refractory surface is within the range from about 0.5 inches (12.7 mm) to about 8 inches (203.2 mm). The height of the rib on the inner sloped portion [48] *45* of the [refractory surface] *nozzle* is within a range of from about 0.25 inches (6.35 mm) to about 2 inches (50.8 mm). The rib on the outer portion [46] *42* is aligned with the rib *48* on the inner sloped portion [48] *45*, and a tapered transition 50 between the outer and inner rib is provided. For purposes of the claims, the term "sloped" refers to a portion of the refractory surface which converges toward the nozzle opening *41* at a taper which is greater than 10 degrees per unit of length thereof. For slope angles of less than 10 degrees taper on an inner portion of the refractory surface, no ribs are required. Preferably, four ribs spaced 90 degrees apart are provided. Preferably, the ribs on the article for use in the ladle have a height within a range of from about 3 inches (76.2 mm) to about 5 inches (127.0 mm) on the outer portion and a height within the range of 0.5 inches (12.7 mm) to about 1 inch (25.4 mm) on the sloped inner portion thereof. Preferably, the sloped inner portion of the article makes an angle with the range of about 30 to about 60 degrees with respect to the axis of the nozzle opening. The shape of the ribs and other aspects of the article for use in the ladle are basically the same as for the article used in the tundish.

It will be apparent to those skilled in the art that variations in the design, structure, material, and use of the article may be made without departing from the spirit an scope of the invention as set forth in the claims appended hereto.

I claim:

1. A refractory article for the prevention of vortexing during draining of molten metal *through a nozzle* from a metallurgical vessel, said refractory article comprising:

a refractory surface extending from an outer peripheral edge thereof mateable with an inner refractory surface of the metallurgical vessel *to* an inner edge [forming] *mateable with an axially inner end of said nozzle to form* an opening for draining of molten metal from said metallurgical vessel, at least one rib protruding upwardly from the refractory surface of said article, said rib extending in a substantially radial direction outwardly from the opening therein, said rib having [an] *a radially* inner end located substantially on a diameter of an *axially* innermost end of said opening in the [refractory article, said rib having a length in a substantially radial direction from the opening at least about twice the diameter of an innermost end of said opening, said rib having a height above the refractory surface of said article within a range of from about 0.25 inches (6.35 mm) to about 8 inches (203.2 mm)] *nozzle.*

2. The refractory article of claim 1 *in combination with a nozzle* wherein the *a nozzle contains a sloping surface at its axially innermost end forming said opening and the* refractory surface of said article includes an outer portion remote from said opening and an inner portion extending from the outer portion to the opening *in said nozzle*, said outer portion being substantially planar and normal to the axis of said opening, said inner portion being sloped at an angle of more than 10 degrees downwardly to the opening *and along the sloping surface of the nozzle*, the height of said rib in the outer portion being within the range of about 0.5 inches (12.7 mm) to about 8 inches (203.2 mm) and the height of said rib [in the inner portion] *along the sloping surface of said nozzle* being within the range of about 0.25 inches (6.35 mm) to about 2 inches (50.8 mm).

3. The refractory article of claim 1 wherein said rib has a uniform height along the length thereof.

4. The refractory article of claim 1 wherein there are four ribs spaced about ninety degrees from each other.

5. The refractory article of claim 4 wherein each of said ribs has a uniform height along their length, and the height of each of said ribs is within the range of from about 2 inches (50.8 mm) to about 4 inches (101.6 mm).

6. The refractory article of claim 1 wherein said rib has a substantially trapezoidal shape n cross section.

7. The refractory article of claim 2 wherein the inner portion of the refractory surface is sloped at an angle within the range of from about 30 to about 60 degrees with respect to the axis of the opening therein.

8. The refractory article of claim 7 wherein the height of the rib in the outer portion is within the range of from about 3 inches (76.2 mm) to about 5 inches (127.0 mm), and the height of said rib in the inner portion is within the range of from about 0.5 inches (12.7 mm) to about 1 inch (25.4 mm).

9. The refractory article of claim 5 wherein the length of said ribs is within the range of from about 2 times to about 10 times the diameter of the innermost end of the nozzle opening therein.

10. The refractory article of claim 8 wherein there are four ribs spaced about ninety degrees from each other, and the length of said ribs is within the range of from about 2 to about 10 times the diameter of the innermost end of the opening therein.

*11. The refractory article of claim 1 wherein said rib has a length in a substantial radial direction from said nozzle opening of at least about twice the diameter of said opening.*

*12. The refractory article of claim 1 wherein said rib has a height above the refractory surface of said article within a range of from about 0.25 inches (6.35 mm) to about 8 inches (203.2* mm).

* * * * *